United States Patent [19]

Bullard et al.

[11] 4,153,771

[45] May 8, 1979

[54] HYDROCARBON RESIN PREPARED FROM ANTIMONY PENTAFLUORIDE OR FERRIC CHLORIDE

[75] Inventors: Herbert L. Bullard, Norton Village; Larry D. Roduner, Akron, both of Ohio

[73] Assignee: The Goodyear Tire & Rubber Company, Akron, Ohio

[21] Appl. No.: 662,762

[22] Filed: Mar. 1, 1976

Related U.S. Application Data

[63] Continuation of Ser. No. 541,470, Jan. 15, 1975, abandoned, which is a continuation of Ser. No. 422,119, Dec. 5, 1973, abandoned, which is a continuation of Ser. No. 192,650, Oct. 26, 1971, abandoned.

[51] Int. Cl.$^2$ .............................................. C08F 4/26
[52] U.S. Cl. ....................................... 526/221; 260/5; 260/889; 526/339
[58] Field of Search .................... 526/221; 260/680 B

[56] References Cited

U.S. PATENT DOCUMENTS

| | | | |
|---|---|---|---|
| 2,581,154 | 1/1952 | Walsh et al. | 260/85.3 |
| 3,505,300 | 4/1970 | Galloway | 260/80.7 |
| 3,509,239 | 4/1970 | Tindall | 260/889 |
| 3,541,188 | 11/1970 | Srail | 260/889 |
| 3,577,398 | 5/1971 | Pace et al. | 260/85.3 |
| 3,692,756 | 9/1972 | St. Cyr | 260/80.7 |

*Primary Examiner*—Stanford M. Levin
*Attorney, Agent, or Firm*—H. C. Young, Jr.

[57] ABSTRACT

There is disclosed a hydrocarbon derived resin having a structure characterized by a softening point in the range of about 0° C. to about 45° C. and comprising from about 40 to about 80 weight percent units derived from piperylene and correspondingly from about 60 to about 20 weight percent units derived from 2-methyl-2-butene prepared by the method which comprises polymerizng a mixture comprising from about 20 to about 75 weight percent piperylene and correspondingly from about 80 to about 25 weight percent 2-methyl-2-butene in the presence of a catalyst selected from antimony pentafluoride and ferric chloride. The resin has particular utility when combined with rubber as a tackifier to form pressure sensitive adhesives.

1 Claim, No Drawings

HYDROCARBON RESIN PREPARED FROM ANTIMONY PENTAFLUORIDE OR FERRIC CHLORIDE

This is a Continuation of application Ser. No. 541,470, now abandoned, filed Jan. 15, 1975, which was a continuation of Ser. No. 422,119, Dec. 5, 1973, now abandoned, which in turn was a continuation of application Ser. No. 192,650, filed Oct. 26, 1971, now abandoned. This invention relates to synthetic hydrocarbon-derived resins and to a method of preparing such resins.

Liquid resins with softening points below about 30° C. have unique utility for many commercial applications. They can be particularly useful for the preparation of pressure sensitive adhesives if they also have good tackifying properties. Therefore, resins having a combination of these qualities are highly desirable and are sought after for commercial use.

Many unsaturated hydrocarbons polymerize in the presence of acidic catalysts, including metal halides, to produce resins having various physical properties. Some produce rubbery polymers, some produce tackifying polymers having high softening points, whereas other monomers produce only oily products.

For example, piperylene has been taught to produce polymers having little or no commercial value whereas 2-methyl-2-butene forms low molecular weight oily products. Surprisingly, copolymers of piperylene and 2-methyl-2-butene have been found to provide useful tackifying resins having relatively high softening points in the range of about 80° C. to about 110° C. (U.S. Pat. No. 3,577,398) when prepared with aluminum chloride.

However, it has now been discovered that commercially useful normally liquid tackifying resins are prepared by polymerizing hydrocarbon mixtures comprising primarily piperylene and 2-methyl-2-butene in the presence of certain types of catalysts. These resins are physically different from the described piperylene or 2-methyl-2-butene homopolymers and even from the structure of their high softening point copolymer prepared with an aluminum chloride catalyst.

In accordance with this invention, it has been discovered that a hydrocarbon derived resin with a structure characterized by having a relatively low softening point in the range of about 0° C. to about 45° C., and preferably in the range of about 10° C. to about 25° C., is prepared by polymerizing a mixture comprising from about 20 to about 75 weight percent of piperylene and correspondingly from about 80 to about 25 weight percent of 2-methyl-2-butene in the presence of an acidic catalyst selected from the group consisting of antimony pentafluoride and ferric chloride. It is preferred that the mixture to be polymerized comprises from about 35 to about 65 weight percent of piperylene and correspondingly from about 65 to about 35 weight percent of 2-methyl-2-butene.

Thus, the desired resinous materials prepared from the polymerizable mixture are required to have primarily a backbone of units derived from piperylene/2-methyl-2-butene and comprise from about 40 to about 80 weight percent units derived from piperylene and from about 60 to about 20 weight percent units derived from 2-methyl-2-butene and preferably from about 50 to about 75 percent from piperylene and correspondingly from about 50 to about 25 percent from 2-methyl-2-butene. The piperylene in the monomer mixture therefore normally enters into the polymerization reaction at a faster rate than the 2-methyl-2-butene.

At the lower softening point ranges, such as the 0° C. to 25° C. range, it is easier to characterize the resins by their viscosity at 25° C. Some correlation does appear to exist. Thus, for example, viscosities at 25° C. of about 8,000, 40,000, 100,000, 400,000 and 1,000,000 centipoises have been found to compare somewhat to softening points of 0° C., 10° C., 15° C., 20° C., and 25° C. Thus, the resins of this invention in the lower softening point range may further be characterized by having a proportional viscosity in the range of from about 8,000 to about 1,000,000 and preferably from about 40,000 to 1,000,000 centipoises at 25° C. The softening point and viscosity of the product depend somewhat on the degree of stripping. Typically a major portion of the polymerization product is the resin of this invention whereas a minor portion consists of oil-like products. Reference is made to the degree of stripping because of the sensitivity of viscosity to small amounts of low viscosity of the oil-like products and unreacted hydrocarbons. Thus, it is desired to remove at least about 90 weight percent of such materials from the product.

In the practice of this invention, about 40 to about 90, preferably 50 to about 75, weight percent of the piperylene/2-methyl-2-butene mixture is converted to the resin of this invention, correspondingly from about 50 to about 25 weight percent is converted to dimers, trimers and low molecular weight oil polymers with the remainder being usually less than 5 weight percent essentially unreacted. Thus, a major portion of the reactants is normally converted to the resin of this invention.

Further typical characterizations of the resins of this invention are a Gardner color of about 2 to about 18, an acid number of from about 0.6 to about 1.5, a saponification number of from about 7 to about 25, and a specific gravity of from about 0.85 to about 1.0. The characteristic softening point is determined by ASTM Method E-28-58T, usually required to be modified by first cooling the sample and its bath appropriately below room temperature, and then gradual heating to the resin's softening point.

The liquid resins of this invention can be modified and maintain their characteristics, so long as they maintain their required piperylene/2-methyl-2-butene backbone, by the addition of up to about 20 parts by weight of piperylene dimers or piperylene trimers or other unsaturated hydrocarbons containing from 4 to 6 carbon atoms, and mixtures thereof to 100 parts by weight of the piperylene/2-methyl-2-butene monomer mixture. Representative examples of such hydrocarbons are butene and substituted butenes, such as 2-methyl-1-butene, 2,3-dimethyl-1-butene, 2,3-dimethyl-2-butene, 3,3-dimethyl-1-butene; the pentenes and substituted pentenes, such as 1-pentene, 2-pentene, 2-methyl-1-pentene, 2-methyl-2-pentene, 3-methyl-2-pentene, 4-methyl-1-pentene; 4-methyl-2-pentene, the hexenes, such as 2-hexene; diolefins, such as isoprene, and cyclic unsaturated hydrocarbons, such as cyclopentene, cyclohexene and 1,3-cyclopentadiene.

In practice, the resins of this invention can comprise up to about 15 weight percent units derived from the described addition of up to about 20 parts by weight to the monomer mixture of piperylene dimers, piperylene trimers, and the other unsaturated hydrocarbons containing from 4 to 6 carbon atoms heretofore mentioned in addition to the required backbone of the units derived from piperylene and from 2-methyl-2-butene.

These prepared resinous materials are useful as modifiers for natural rubber and various synthetic rubbers. Representative of such synthetic rubbers are butadiene-styrene copolymers, butadiene-acrylonitrile copolymers and stereospecific polymers of dienes, such as butadiene and isoprene. The resins are usually desirable as extenders and tackifiers in such elastomeric materials and especially where resins are desired which have a light color. They are particularly useful when combined as an admixture with natural rubber or various synthetic rubbers to form pressure sensitive adhesives. They can also be blended with other higher softening point resins for these purposes.

In carrying out the polymerization reaction, the catalyst may be added to the hydrocarbon mixture or the hydrocarbon mixture may be added to the catalyst. If desired, the catalyst and mixture of hydrocarbons can be added simultaneously or intermittently to a reactor. The reaction can be conducted continuously or by batch process techniques generally known to those skilled in the art. The amount of catalyst is not of primary importance, although a sufficient amount is used to cause the polymerization reaction to occur.

The reaction is conveniently carried out in the presence of a diluent because it is usually exothermic. However, with adequate mixing and cooling, the temperature can be controlled and the reaction conducted without a diluent being present. Various diluents which are inert in that they do not enter into the polymerization reaction may be used. Representative examples of inert diluent are aliphatic hydrocarbons such as pentane, hexane, and heptane, aromatic hydrocarbons such as toluene and benzene, and unreacted residual hydrocarbons from the reaction mixture.

A wide range of temperatures can be used for the polymerization reaction. The polymerization can be carried out at temperatures in the range of from about −10° C. to about 100° C., preferably about 10° C. to about 40° C., although a satisfactory reaction can normally be carried out to produce the resin of this invention at a temperature in the range of from about 0° C. to about 50° C. The polymerization reaction pressure may be atmospheric or above or below atmospheric pressure. Typically a satisfactory polymerization can be conducted when the reaction is carried out at about autogeneous pressure developed by the reactants under the operating conditions used. The time of the reaction is not generally of primary importance and can vary from a few seconds to 12 hours or more.

EXAMPLE I

To a reactor was charged 100 parts of heptane, 7.5 parts of antimony pentafluoride, and, with stirring over a period of about 90 minutes, 200 parts of a liquid hydrocarbon mixture. The hydrocarbon mixture comprised primarily piperylene and 2-methyl-2-butene.

The mixture was then stirred for an additional hour while maintaining its temperature in the range of about 28° C. to about 32° C., for a total reaction time of 2½ hours. The catalyst was neutralized with a mixture of water and lime and the resulting mixture refluxed at 60° C. for 30 minutes and filtered. The filtrate was steam stripped to a steam/resin weight ratio of about 2:1.

The resulting resin had a softening point of about 45° C. according to ASTM E28-58T and a Gardner color of 5 (50 percent in toluene).

The liquid hydrocarbon mixture used to prepare the polymers of this example was shown of the type having the general composition shown in Table 1.

Table 1

| | |
|---|---|
| 3,3-dimethyl-1-butene | 1.4 |
| trans-2-pentene | 0.4 |
| cis-2-pentene | 1.6 |
| 2-methyl-2-butene | 40.6 |
| Isoprene | 0.8 |
| 2-methyl pentane | 0.3 |
| ¾ methyl-1-petene | 0.8 |
| trans 1,3-pentadiene | 27.5 |
| cis 1,3-pentadiene | 15.8 |
| 4-methyl-2-pentene | 4.5 |
| 2,3-dimethyl-1-butene | 0.9 |
| misc. $C_5$—$C_7$ hydrocarbons | 1.5 |
| 1,3-cyclopentadiene | 0.9 |

EXAMPLE II

To a reactor was charged 100 parts of heptane, 9 parts of ferric chloride and with stirring over a period of about 90 minutes, 200 parts of a liquid hydrocarbon mixture of the type used in Example I.

The mixture was stirred for an additional 4½ hours while maintaining a temperature of about 30° C. for a total reaction time of about 6 hours. The catalyst was neutralized with a mixture of water and lime and the resulting mixture refluxed at about 60° C. for about one hour and filtered. The filtrate was vacuum distilled to a pot temperature of about 118° C. and a reduced pressure of about 0.35 millimeters of mercury.

The resulting resin had a softening point of about 24° C. according to ASTM E-28-58T and a Gardner color of 18.

In these examples the invention has been illustrated although it is not intended that the invention be limited thereto. Also in these examples, the parts and any percentages are by weight unless otherwise indicated.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a hydrocarbon derived resin having a structure characterized by a softening point in the range of about 10° C. to about 25° C. and comprising from about 50 to about 75 weight percent units derived from piperylene and correspondingly from about 50 to about 25 weight percent units derived from 2-methyl-2-butene and further characterized by having a viscosity at 25° C. in the range of about 40,000 to about 1,000,000 centipoises, said method consisting essentially of (A) polymerizing a mixture of about 35 to about 65 weight percent piperylene and correspondingly from about 65 to about 35 weight percent 2-methyl-2-butene, at a temperature in the range of about 10° C. to about 40° C. in the presence of ferric chloride and a diluent selected from the group consisting of pentane, hexane, heptane, toluene, benzene and unreacted hydrocarbons from the polymerization mixture.

* * * * *